United States Patent
Kopish

Patent Number: 5,934,623
Date of Patent: Aug. 10, 1999

[54] CONDUCTOR MANAGEMENT SYSTEM

[75] Inventor: Andrew J. Kopish, Green Bay, Wis.

[73] Assignee: Krueger International, Inc., Green Bay, Wis.

[21] Appl. No.: 08/937,048

[22] Filed: Sep. 24, 1997

Related U.S. Application Data

[63] Continuation of application No. 08/519,040, Aug. 24, 1995, abandoned.

[51] Int. Cl.$^6$ .................................................. F16L 3/08
[52] U.S. Cl. ............................. 248/65; 248/73; 248/74.2; 248/74.5
[58] Field of Search ................................ 248/49, 65, 71, 248/73, 74.2, 345.1, 74.5, 74.3; 174/48, 49, 101, 135; 361/724, 826, 827, 828, 829

[56] References Cited

U.S. PATENT DOCUMENTS

| | | | |
|---|---|---|---|
| 1,981,973 | 11/1934 | Tinnerman | 248/73 |
| 2,318,853 | 5/1943 | Hall | 248/73 |
| 2,666,968 | 1/1954 | Bedford, Jr. | 248/73 |
| 2,674,431 | 4/1954 | Attwood | 248/73 X |
| 2,790,559 | 4/1957 | Stephenson et al. | 248/73 X |
| 2,880,949 | 4/1959 | Fuss | 248/73 X |
| 3,259,347 | 7/1966 | Yates | 248/73 |
| 3,423,055 | 1/1969 | Fisher | 248/73 |
| 3,491,971 | 1/1970 | Fisher | 248/65 |
| 3,523,669 | 8/1970 | Avallone | 248/73 |
| 4,113,110 | 9/1978 | Mittag | 248/345.1 X |
| 4,728,064 | 3/1988 | Caveney | 248/73 X |
| 4,826,112 | 5/1989 | Rettler | 248/65 |
| 5,044,583 | 9/1991 | Daigle et al. | 248/65 X |
| 5,106,040 | 4/1992 | Cafmeyer et al. | 248/73 |
| 5,106,050 | 4/1992 | Vaccaro et al. | 248/74.2 X |
| 5,354,020 | 10/1994 | Richards | 248/73 X |
| 5,553,892 | 9/1996 | Pitchford et al. | 248/65 X |
| 5,564,672 | 10/1996 | Matson | 248/74.3 |

FOREIGN PATENT DOCUMENTS

| | | | |
|---|---|---|---|
| 1296677 | 11/1972 | United Kingdom | 248/73 |
| 1022820 | 3/1996 | United Kingdom | 248/73 |

*Primary Examiner*—Daniel P. Stodola
*Assistant Examiner*—Richard M. Smith
*Attorney, Agent, or Firm*—Andrus, Sceales, Starke & Sawall

[57] ABSTRACT

A conductor management assembly for use in receiving and concealing a plurality of conductors comprises an elongated furniture component having a longitudinal recess defined by two or more recess walls. A series of spaced slots is formed in at least one of the recess walls. A conductor mounting bracket is removably mountable to the furniture component by means of at least one tooth formed in the mounting bracket. The tooth is removably engageable with at least one of the slots. The mounting bracket and furniture component define an internal space for receiving and concealing conductors routed along the furniture component. The mounting bracket is constructed and arranged to permit access to the internal space without removing the mounting bracket from the furniture component.

12 Claims, 1 Drawing Sheet

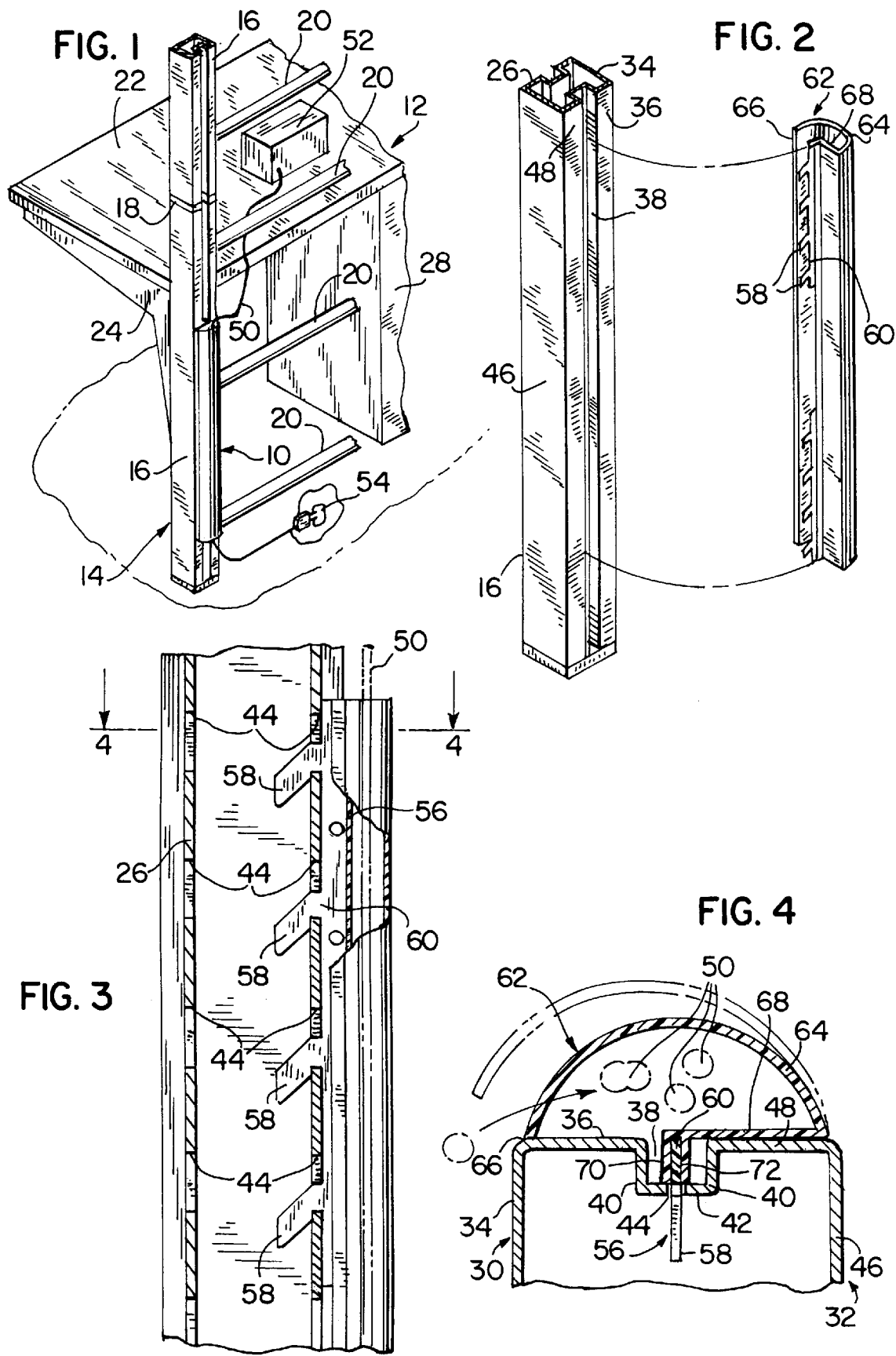

CONDUCTOR MANAGEMENT SYSTEM

CROSS-REFERENCE TO RELATED APPLICATION

This application is a continuation of Ser. No. 08/519,040 filed Aug. 24, 1995, now abandoned.

BACKGROUND AND SUMMARY OF THE INVENTION

This invention relates generally to the handling of cables, wires and other conductors, and, more particularly, pertains to the organizing, concealing and protecting of conductors relative to a furniture component.

Applicant's pending U.S. patent application Ser. No. 08/472,536 filed Jun. 7, 1995 discloses a flexible furniture system for use in residence halls or similar settings in which furniture components can be easily moved, repositioned, or reconfigured according to the requirements of the user or according to use of the room. In the course of constructing such a flexible furniture system, it is common to include a desk, work surface, or shelf on which one or more electrical appliances such as a task light, alarm clock, audio/visual apparatus, calculator and the like is supported. The cables, cords and wires extending between the appliances and the electrical receptacles on the floor or wall often form a small, unsightly jungle of disorganized conductors subject to being snagged, stepped on, and tripped over, the result of which may be damage or injury. In addition, multiple conductors assume a jumbled orientation which makes reconfiguration or repositioning of the furniture more time consuming.

Accordingly, it is desirable to provide a conductor management assembly which is effective to safely and conveniently retain one or more appliance cables, wires, cords, and the like relative to a furniture component along which the conductors extend on their path to an electrical receptacle. It is also desirable to provide a conductor management assembly which is relatively simple in construction, components and operation without need for tools and without change to the basic structure of the furniture component with which it is used.

The conductor management assembly of the present invention advantageously provides positive, reliable organization, concealment, and protection of one or more appliance cables, wires, cords and the like. The assembly is particularly attractive in allowing access to a bracket structure protecting the conductors without separating the entire bracket structure from its associated furniture component.

These and other aspects of the invention are realized in a conductor management assembly comprising at least one support component having a plurality of spaced slots formed therein and a conductor mounting bracket having a series of teeth selectively engageable with the spaced slots for removably mounting the conductor mounting bracket to the support component. The mounting bracket and the support component define an internal space for receiving and protecting at least one conductor disposed along the support component.

In accordance with another aspect of the invention, a conductor management assembly for use in receiving and concealing a plurality of conductors comprises an elongated furniture component having a longitudinal recess defined by two or more recess walls. A series of spaced slots is formed in at least one of the recess walls and a conductor mounting bracket is removably mountable to the furniture component by means of at least one tooth formed on the mounting bracket. The tooth is removably engageable with at least one of the slots. The mounting bracket and the furniture component define an internal space for receiving and concealing conductors routed along the furniture component. The mounting bracket is constructed and arranged to permit access to the internal space without removing the mounting bracket from the furniture component.

In yet another aspect of the invention, a method for managing one or more conductors comprises the steps of: providing at least one support component formed with a plurality of spaced slots; providing a resilient conductor mounting bracket formed with a series of teeth; mounting the conductor bracket on the support component by selectively positioning the teeth in the slots and forming an internal space for receiving conductors; and manipulating the mounting bracket to permit access to and position at least one conductor within the internal space.

BRIEF DESCRIPTION OF THE DRAWINGS

The invention will become better understood by reference to the following detailed description of the preferred exemplary embodiment when read in conjunction with the appended drawing wherein like numerals denote like elements; and FIG. 1 is an isometric view of a furniture system equipped with a conductor management assembly embodying the present invention;

FIG. 2 is an exploded view of the component of the conductor management assembly shown in FIG. 1;

FIG. 3 is an enlarged, fragmentary sectional view of the conductor management assembly shown in FIG.; and FIG. 4 is a sectional view taken on line 4—4 of FIG. 3.

DETAILED DESCRIPTION OF THE PREFERRED EMBODIMENT

FIG. 1 illustrates a wire, cable or conductor management assembly 10 for use in combination with a portion of a furniture system 12 as disclosed in applicant's pending U.S. patent application Ser. No. 08/472,536 filed Jun. 7, 1995, the disclosure of which is hereby incorporated by reference. Furniture system 12 includes a lower frame assembly 14 comprising a pair of upper and lower posts 16 secured one on top of the other by a connector 18. A series of horizontal cross members 20 extend from the facing walls of the upper and lower posts 16 to opposite facing walls of complementary upper and lower vertical posts (not shown). A desk top or work surface 22 includes side brackets 24 which are removably secured to an inner side wall 26 of lower vertical post 16. A floor mounted file cabinet 28 is adapted for placement below work surface 22.

Vertical posts 16 are substantially identical, each being constructed of an inner post section 30 and an outer post section 32. Post section 30 includes an inner wall 34 and a pair of side walls 36 having recesses 38 formed by recess side walls 40 and an outwardly facing recess wall 42. A series of slots 44 are formed in outwardly facing recess walls 42. Outer post section 32 includes an outer wall 46 and a pair of side walls 48. Each post 16 thus includes oppositely facing recesses 38 having a line of spaced, vertical slots 44 with recesses 38 being formed in opposite facing post end walls defined by side walls 36, 48. Post section walls 34, 46 extend between and interconnect the post end walls. With this construction, posts 16 define a hollow interior bounded by walls resembling an H-shape in cross-section.

According to the invention, a wire, cable or conductor management assembly 10 used in combination with furniture system 12 is advantageously employed to shield or protect one or more wires, cables, cords or the like extending between an electrical appliance 52 typically located on the work surface 22 and an electrical outlet or receptacle 54.

The conductor management assembly 10 includes a bracket member 56 having teeth 58, and an axially extending mounting section 60 from which teeth 58 extend laterally and downwardly. Conductor management assembly 10 further includes a wire or conductor cover 62 having an arcuate wall 64 defining a free end 66, a base 68 extending from the opposite end of cover 62 and a mounting section at the end of base 68 defined by a pair of spaced flanges 70, 72. Conductor management assembly 10 is constructed by inserting bracket mounting section 60 into the space between flanges 70, 72 which provides an interference fit between mounting sections 60 and flanges 70, 72. Teeth 58 are then engaged within selected slots 44 so as to mount conductor management assembly 10 to posts 16 in any location as desired. When so mounted, the internal space defined by arcuate wall 64 receives cables, wires or conductors extending between a power receptacle 54 and an electrical device 52 of any sort, such as a task light, alarm clock, calculator or the like. Typically, conductor management assembly 10 will be mounted to the vertical post 16 below work surface 22 so as to conceal wires or cables which otherwise may be visible. The bracket and cover members 56, 62 respectively, of conductor management assembly 10 may be formed in any length as desired so as to accommodate variations in the length along which it is desired to conceal wires, cables or conductors 50. Alternatively, two or more conductor management assemblies 10 can be employed in combination to enclose longer lengths of wires or cables.

As a salient feature of the invention, conductor management assembly 10 is preferably constructed of a resilient or flexible material such as plastic which will allow access to the interior space defined by the arcuate cover 62 without removal of the entire conductor management assembly from the vertical post 16. Access to this internal space is enabled by pulling the free end 66 of cover 62 slightly away from side wall 36 with one hand, as shown in phantom in FIG. 4, and positioning the wire, cable, conductor 50 or the like with the other hand beneath the cover 62 after which the free end 66 springs back against side wall 36. Cover 62 is dimensioned and configured such that free end 66 engages side wall 36 when released by the user. To accomplish this, wall 64 is typically oriented such that free end 66 is located past the plane of base 68 when cover 62 is disengaged from post 16. With this construction, wall 64 exerts a biasing force on free end 66 when assembly 10 is mounted to post 16 to force free end 66 into engagement with wall 36.

It should be understood that the present invention provides a conductor management assembly which is easily installed and used without the need for tools. It can also be appreciated that the conductor management assembly of the present invention effectively channels and centralizes the routing of conductors so as to reduce the likelihood of injury and/or damage from snagging or stepping on the conductors. It is also noteworthy to point out that the conductors may be easily added or removed from the assembly without having to separate the entire assembly from its associated furniture component.

While the invention has been described with reference to a preferred embodiment, those skilled in the art will appreciate that certain substitutions, alterations and omissions may be made without departing from the spirit thereof. For example, the conductor management assembly may be used in any orientation and size desired. While the above disclosure illustrates the use of electrical conductors, the management assembly of the present invention is equally applicable to shielding other fluid or fiber optic conductors as desired. Further, it is understood that the conductor management assembly can be used in other furniture arrangements than that illustrated, or in any other environment where it is desired to conceal or house cables or wires. Accordingly, the foregoing description is meant to be exemplary only, and should not be deemed limitative on the scope of the invention set forth in following claims.

I claim:

1. A conductor management assembly for use with a furniture component, comprising:
    a base adapted to be mounted to the furniture component, wherein the base defines a first end having mounting structure for mounting to the furniture component and a second end spaced from the first end, said mounting structure having a plurality of fastener members axially aligned and longitudinally spaced; and
    a cover member having a fixed end secured to and extending from the second end of the base and a free end spaced from the fixed end and extending past the first end of the base, wherein the cover member defines an internal space into which the first end of the base extends and within which the mounting structure is located, and wherein the free end of the cover member is movable between an open position providing access to the internal space and a closed position preventing access thereto.

2. A conductor management assembly comprising:
    at least one support component having a plurality of spaced slots formed therein, wherein said support component includes an outer wall having a longitudinal recess formed therein, wherein said longitudinal recess is defined by an inner, outwardly facing recess wall and a pair of recess side walls extending between said inner recess wall and said outer wall of said support component, wherein said slots are formed in said inner, outwardly facing recess wall; and
    a conductor mounting bracket having a series of teeth extending into said recess and selectively engageable with certain ones of said spaced slots for removably mounting said conductor mounting bracket to said support component, said mounting bracket including a movable cover which cooperates with said support component outer wall for defining an internal space for receiving and protecting at least one conductor disposed along said support component when said cover is in a closed position, and wherein said cover is movable to an open position while said teeth remain engaged with said slots for providing access to said internal space.

3. The assembly of claim 2, wherein said mounting bracket includes an axially extending mounting section extending along a longitudinal axis and from which said teeth extend laterally and downwardly, wherein said mounting section is received within said recess.

4. The assembly of claim 3, wherein said cover defines an arcuate wall defining a free end, and a base extending from an end of said cover opposite said free end, wherein said mounting section is interconnected with said base and is defined by a pair of flanges.

5. The assembly of claim 4, wherein said base lies adjacent said outer wall of said support component and said free end is normally in contact with a portion of said outer wall spaced from said base.

6. The assembly of claim 2, wherein said mounting bracket is comprised of a resilient material.

7. The assembly of claim 2 wherein said series of teeth extending into said recess and said selectively engageable slots are included within the internal space defined by said movable cover of said mounting bracket in cooperation with said support component outer wall.

8. A conductor management assembly comprising:
   at least one support component having a plurality of spaced slots formed therein, wherein said support component comprises a post including a substantially vertical longitudinal recess defined by an inner, outwardly facing recess wall and a pair of recess side walls extending between said inner recess wall and an outer surface of said post, wherein said slots are formed in said inner, outwardly facing recess wall; and
   a conductor mounting bracket having a series of teeth selectively engageable with said spaced slots for removably mounting said conductor mounting bracket to said support component, said mounting bracket and said support component defining an internal space for receiving and protecting at least one conductor disposed along said support component, wherein said mounting bracket includes a conductor cover having an arcuate wall defining a free end, a base extending from the opposite end of said cover and an axially extending mounting section at the end of said base defined by a pair of flanges, wherein said axially extending mounting section is disposed in an interference fit between said flanges.

9. The assembly of claim 8 wherein said series of teeth engageable with said spaced slots are included within the internal space defined by said conductor mounting bracket and said support component.

10. A conductor management assembly for use with a furniture system including a support component comprising:
    a resilient cover member;
    a mounting arrangement for mounting the cover member to the support component, said mounting arrangement having a plurality of fastener members axially aligned and longitudinally spaced;
    wherein the cover member defines a fixed end and a free end spaced from the fixed end, and wherein an internal space is located between the free end and the fixed end for receiving one or more conductors;
    a base defining a first end interconnected with the mounting arrangement and a second end spaced from the first end and interconnected with the fixed end of the cover member, wherein the first end of the base extends into the internal space defined by the cover member and the mounting arrangement is located within the internal space; and
    wherein the cover member free end is movable relative to the fixed end between an open position providing access to the internal space and a closed position preventing access to the internal space.

11. A conductor management assembly for use with a furniture component having an outer wall comprising:
    a base defining a first end and a second end, wherein the first end of the base is adapted to be mounted to the furniture component outer wall; and
    a resilient cover member connected to the base, wherein the cover member is constructed so as to define a first end, a second end, and an internal space located between the first end of the cover member and the second end of the cover member for receiving one or more conductors, and wherein the second end of the base is interconnected with the first end of the cover member and wherein the first end of the base extends into the internal space and includes a mounting arrangement located within the internal space for fixedly mounting the first end of the cover member to the furniture component outer wall, said mounting arrangement having a plurality of fastener members axially aligned and longitudinally spaced.

12. A conductor management assembly for use with a furniture system including a support component, comprising:
    a resilient cover member; and
    a mounting arrangement interconnected with the cover member for mounting the cover member to the support component, said mounting arrangement having a plurality of fastener members axially aligned and longitudinally spaced;
    wherein the cover member defines a fixed end interconnected with the mounting arrangement and a free end spaced from the fixed end and movable relative thereto, and an internal space located between the fixed end and the free end and adapted to receive one or more conductors, wherein the free end is movable relative to the fixed end between an open position providing access to the internal space and a closed position preventing access thereto; and wherein the mounting arrangement is interconnected with a base extending from the fixed end of the cover member into the internal space toward the free end of the cover member, and wherein the mounting arrangement is interconnected with the base and is located within the internal space defined by the cover member.

* * * * *